(12) United States Patent
Mikelich et al.

(10) Patent No.: US 10,165,427 B1
(45) Date of Patent: Dec. 25, 2018

(54) REMOTE INTERNET COMMUNICATION WITH RF NETWORK DEVICES

(71) Applicants: John Louis Mikelich, Los Angeles, CA (US); Christopher Gary Herbert, Santa Barbara, CA (US); Seth Andrew Robin, Santa Barbara, CA (US)

(72) Inventors: John Louis Mikelich, Los Angeles, CA (US); Christopher Gary Herbert, Santa Barbara, CA (US); Seth Andrew Robin, Santa Barbara, CA (US)

(73) Assignee: TruckR, Inc., Santa Barbara, CA (US)

( * ) Notice: Subject to any disclaimer, the term of this patent is extended or adjusted under 35 U.S.C. 154(b) by 0 days.

(21) Appl. No.: 15/632,328

(22) Filed: Jun. 24, 2017

(51) Int. Cl.
    *H04B 7/00* (2006.01)
    *H04W 4/80* (2018.01)
    *H04L 29/08* (2006.01)
    *H04W 8/00* (2009.01)
    *H04L 12/26* (2006.01)
    *H04W 88/16* (2009.01)

(52) U.S. Cl.
    CPC ........... *H04W 4/80* (2018.02); *H04L 43/0823* (2013.01); *H04L 67/26* (2013.01); *H04W 8/005* (2013.01); *H04W 88/16* (2013.01)

(58) Field of Classification Search
    CPC ..... H04W 4/029; H04W 8/245; H04W 40/20; H04W 76/10; H04W 8/205; H04W 80/04; H04W 84/12; H04W 88/08; H04W 88/10; H04W 88/16; H04W 92/02; H04W 92/045; H04W 92/12; H04L 67/10; H04L 67/1002; H04L 67/1008
    See application file for complete search history.

(56) References Cited

U.S. PATENT DOCUMENTS

| 2005/0083907 | A1* | 4/2005 | Fishler | H04L 1/1671 370/352 |
| 2016/0239001 | A1* | 8/2016 | Chin | G05B 15/02 |

\* cited by examiner

*Primary Examiner* — Nhan Le
(74) *Attorney, Agent, or Firm* — Mark Rodgers

(57) ABSTRACT

Methods and systems for communication between remote internet enabled devices to RF network based devices. The remote device is able to communicate through a gateway device connected to the internet and capable of RF network communication. It is by communication to this gateway device is that a server is able to identify and communicate with an RF device, such as a Bluetooth enabled tracking device, to uniquely identify it and alter its state, so that multiple users could simultaneously control the RF device without having a direct RF connection to the device.

18 Claims, 5 Drawing Sheets

REMOTE INTERNET COMMUNICATION WITH RF NETWORK DEVICES

CROSS-REFERENCE TO RELATED APPLICATIONS

N/A

BACKGROUND

Field

The disclosure relates generally to communication between remote internet enabled devices to RF network based tracking devices and, more particularly, to communication through a gateway device connected to the internet and capable of RF network communication.

Description of Related Art

Low cost tracking devices, which communicate wirelessly with Personal Electronic Devices, or user devices in general, are becoming increasingly common. Such tracking devices may benefit from implementations that allow communication with multiple remote devices.

SUMMARY

Example embodiments described herein have innovative features, no single one of which is indispensable or solely responsible for their desirable attributes. Without limiting the scope of the claims, some of the advantageous features will now be summarized.

In some embodiments, methods and systems may be provided for communication between remote internet enabled devices to RF network based devices. The remote device, or client, is able to communicate through a gateway connected to the internet and capable of RF network communication. It is by communication to this gateway that a server is able to identify and communicate with a RF device such as a Bluetooth enabled tracing device, to uniquely identify it and alter its state, so that multiple users could simultaneously control the RF device without having a direct RF connection to the device.

In a first aspect, for a system comprising at least one software capable remote device, at least one software and database capable server, at least one software capable and RF capable gateway device, and at least one RF device with a unique identifier, a method may be provided, including: initiating a call from the remote device to the server; receiving the call identifying at least one targeted RF device at the server; querying the server data base to determine if the targeted device is listed, and if not send error coded back to remote device; establishing communication between the server and the gateway device; downloading commands for targeted device from server to gateway device; attempting to communicate with targeted RF device, and if the device has been contacted within a predetermined time and sending command to targeted RF device; and, sending at least one of a success or error report from gateway device to server onto remote device.

In one embodiment of the first aspect, the method may further include setting the query frequency for a targeted RF device based on the battery level of the gateway device. In another embodiment of the first aspect, establishing communication between the server and the gateway device may include the gateway device querying the server and determining if new data is available or having the data pushed to the gateway device from the server.

In one embodiment of the first aspect, the method may further include: receiving commands by the RF device from the gateway device; responding with a success report from the RF device to the gateway device; and performing the commands by the RF device. In another embodiment of the first aspect, the method may further include: scanning an area by the gateway device; storing the unique identifier of any RF devices found in the area; and storing the detected unique identifiers by the gateway device on the server.

In one embodiment of the first aspect, the method may further include storing a time stamp of the time discovered for at least one unique identifier. In one embodiment of the first aspect, the RF device and the gateway device may communicate over an RF communication protocol.

In another embodiment of the first aspect, the RF communication protocol may include one or more of Bluetooth, RFID, Zigbee, or 802.11 WiFI. In one embodiment of the first aspect, the gateway device may be a client device including one or more of a computer, router, phone, tablet, or smart plug. In another embodiment of the first aspect, the Remote Device may be a Personal Electronic Device including computer, smartphones, tablets, and other internet enabled devices.

In a second aspect, a system may be provided including at least one software capable remote device, at least one software and database capable server, at least one software capable and RF capable gateway device, and at least one RF device with a unique identifier, configured to; initiate a call from the remote device to the server; receive the call identifying at least one targeted RF device at the server; query the server data base to determine if the targeted device is listed, and if not send error coded back to remote device; establish communication between the server and the gateway device; download commands for targeted device from server to gateway device; attempt to communicate with targeted RF device, and if the device has been contacted within a predetermined time and send command to targeted RF device; and send at least one of a success or error report from gateway device to server onto remote device.

In one embodiment of the second aspect, the system is further configured to set the query frequency for a targeted RF device based on the battery level of the gateway device. In one embodiment of the second aspect establishing communication between the server and the gateway device may include the gateway device querying the server and determining if new data is available or having the data pushed to the gateway device from the server.

In another embodiment of the second aspect, the system may be further configured to: receive commands by the RF device from the gateway device; respond with a success report from the RF device to the gateway device; and perform the commands by the RF device.

In one embodiment of the second aspect, the system is further configured to: scan an area by the gateway device; store the unique identifier of any RF devices found in the area; and store the detected unique identifiers by the gateway device on the server.

In another embodiment of the second aspect, the system may be further configured to store a time stamp of the time discovered for at least one unique identifier. In one embodiment of the second aspect, the RF device and the gateway device may communicate over an RF communication protocol.

In another embodiment of the second aspect, the RF communication protocol may include one or more of Bluetooth, RFID, Zigbee, or 802.11 WiFI. In one embodiment of the second aspect, the gateway device may be a client device including one or more of a computer, router, phone, tablet, or smart plug. In another embodiment of the second aspect, the Remote Device, may be a Personal Electronic Device including computer, smartphones, tablets, and other internet enabled devices.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
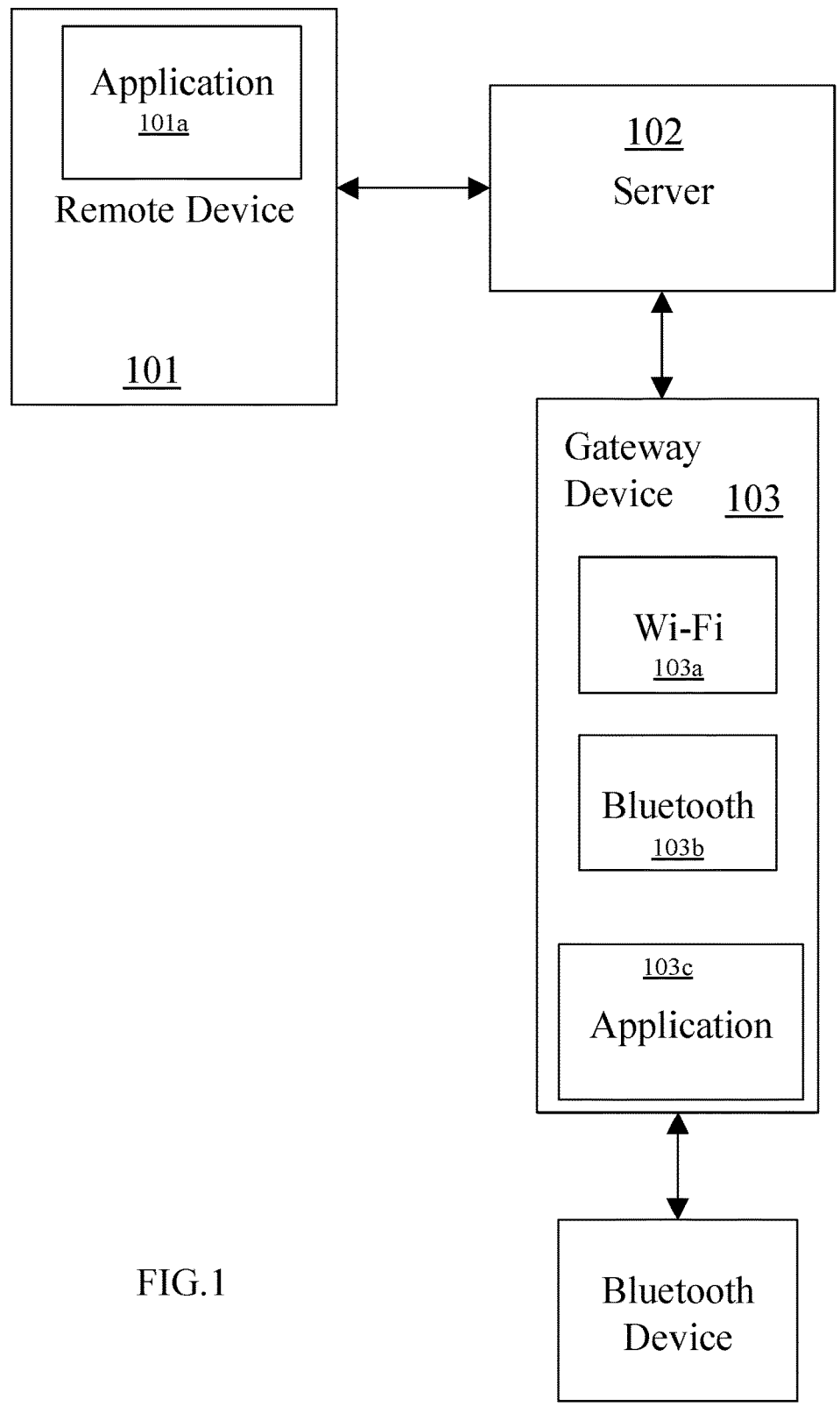
FIG. 1 is a block diagram of an exemplary system embodiment.

Generally described, the disclosure relates to systems and methods including an RF device such as a Bluetooth tracking device or Bluetooth beacon, a gateway device capable of both internet communications and RF (e.g. Bluetooth) communications and has the ability to run software, a server, and a remote device capable of interacting with the internet and running software. The gateway device is in proximity of the RF device so that it can connect to the RF device and interact with the RF device. The gateway device is running software that controls how it connects and interacts with the RF device. The gateway device can also utilize a network connection to communicate with a local or remote server. When a user who wants to interact with the RF device and may not be in range or may not be able to connect to the RF device, they interact with a remote device running software that issues a command to a server.

The server receives this command, stores the command, and looks up a database table of which gateway devices are connected or in range of the targeted RF device. If none of the gateway devices are in proximity of the targeted RF device, the remote device receives an error response. If there is a gateway device in range of the targeted RF device, the server will set a flag on the database or send a push notification to the target gateway device to indicate that the gateway device should interact with the target RF device. When the gateway device receives the indication that it should interact with the target RF device, it will download the command from the server, connect to the target RF device and perform the tasks requested downloaded from the server. Once the command has been successfully accomplished, the gateway device will send a result code back to the server that the command was successfully accomplished or failed. The remote device will receive a push or poll the server to request the result code, which can then be processed by software running on the remote device.

In the some embodiments, the gateway device and remote device could be switched. A gateway device could be a wifi/ble bridge device, a router, a phone, a tablet, a pc, or any other device capable of running software, communicating with a server, and interacting with wireless devices via Bluetooth or any other RF communication protocol. The RF device could use any RF protocol such as Bluetooth, RFID, Zigbee, 802.11, and others.

Examples and implementations described are applicable a system where the RF devices are small wireless tags that can be attached to items such as TrackR Bluetooth enabled tracker devices. The wireless tags emit a signal that uniquely identifies the individual item defined as the tag's unique identifier. The user utilizes a software application executing on a Personal Electronic Device (smartphone, tablet, PC etc.) or other computing device coupled to a network to associate the wireless tag's unique identifier with a database of items the user is interested in tracking. The tag can be attached to keys, wallet, purse, pet, children, furniture, documents, and more. The teachings of the current disclosure may be utilized to allow access to these tags over the internet by user devices not directly associated with specific tags.

Various aspects of the disclosure will now be described with regard to certain examples and embodiments, which are intended to illustrate but not limit the disclosure.

Some embodiments described herein provide access to RF devices over the internet by any internet enabled device running a suitable application. Advantageously, this allows for access to RF devices by a variety of users with suitable permissions granted.

Some embodiments described herein provide for access to RF tracking devices by permitted users across the internet. Advantageously, this allows more options in the location of tracked objects.

System for Remote Internet Communication with RF Devices

FIG. 1 shows a block diagram of an exemplary system with certain elements. Referring to FIG. 1, the Remote Device or Client (101) is able to run an application (101*a*) and is capable of internet communication or ability to communicate with a server. The Remote Device could be capable of also having RF communication so that it is interchangeable with the Gateway Device (103). The server (102) can be a cloud based server, or hardwired server. The basic capabilities of the server are basic computing and database functions. The Gateway device has Wi-fi (103*a*) or another ability to communicate to the server, Bluetooth (103*b*) or another local RF protocol such as Zigbee or RFID, and a application (103*c*). The Gateway device may also not have internet capabilities but some other ability the to communicate with the server. The RF device (104) has basic capabilities and could be a Bluetooth tracker device or could be a more complex device like a laptop or phone. The applications executing on the various elements configure the system to perform as described below.

The current disclosure teaches the ability to control an RF Device 104 remotely via an internet enabled Remote Device 101, such as a Personal Electronic Device including computers, smartphones, tablets and other internet enabled devices. In order to achieve this, a remote device 101 capable of communication with a remote server such as an internet server 102 will make a call to server 102 via a communication protocol such as HTTP. The call will have information containing the unique identifier of the targeted RF device 104 such as the device's mac address or an assigned unique identifier. The call will also contain information on which command to perform on the targeted RF device 104 such as for the case of a Bluetooth tracking device, the command could be to cause the device to ring. Server 102 is able to receive information from the remote device 104 and stores the requested call in its database. The server 102 then queries its database for Gateway devices 103 that have been recently in contact with the targeted remote device. 104.

A Gateway device 103 such as a computer, router, phone, tablet, smart plug, or other client device capable of network communication and local RF communication such as Bluetooth is communicating with the server 102 via polling or push methodology. Polling refers to the method of communication where a client repeatedly asks the server for information via individual calls. Push refers to a method of communication where the server will send information to the client. The Gateway Device 103 scans the area for nearby RF devices 104. The time scale that the Gateway Device 103 scans the area is determined by the application running on the Gateway software 103c and can be set on a simple timer to also be dynamically controlled based on the number of devices in the area of the Gateway device 103 to scan more frequently. The Gateway device 103 scan period could also be controlled based on the battery power of the Gateway Device 103 in such a way that the Gateway device 103 would scan more frequently if the Gateway device 103 battery was high and the Gateway device 103 would scan less frequently if the Gateway device 103 battery was low. When the Gateway device 103 detects an RF device 104, the unique identifier of the device 104 is stored and sent to the server 102. The unique identifier of the RF device 104 could be the Bluetooth mac address for example, dynamically assigned by the Gateway device 103 and server 102, or generated by the RF device 104 dynamically. Other methods for generating the unique identifier could also be used.

The Gateway device 103 will also be able to receive a push notification from the server 102 when the server 102 has a command it wants to send to a nearby target RF device 104 the Gateway device 103 was recently in contact with, e.g. last contact was within a predetermined time. The server 102 determines which Gateway device 103 to send the command to based on a process for determining the last time the Gateway device 103 was in contact with the target RF device 104. One example process to reattempt to write to the target RF device 104 may be sending the data to multiple Gateway devices 103 simultaneously that have all been in contact with the target RF device 104 is a predetermined time frame. Another is using a persistent command that reattempts to send the data periodically, and another is to send the command to all known Gateway devices 103. Other processes may be used.

The Gateway device 103 receives a push notification to send a command to the target RF device 104 or polls the server 102 to receive a flag has been set, notifying the Gateway device 103 to send a command to the target RF device 104. The Gateway device 103 will then download the command information and required information to connect to the target RF device 104 and perform the command. The Gateway device 103 proceeds to scan for the target RF device 104 to determine if it is nearby. The target RF device 104 could also be connected to the Gateway device 103 as well. In either instance, the RF device 104 is determined to be nearby the Gateway device 103 and capable of RF communications. In the case that the RF device 104 is determined not to be nearby the Gateway device 103, an error code is returned back to the server 102 and the server 102 can report this back to the remote device 104 or handle the error in a reattempt to send the command to the target RF device 104. In another implementation, the gateway device 103 can handle not discovering the target RF device 104 and attempt to rediscover the target RF device 104. Other methods for handling this error may be used.

In the case that the target RF device 104 is determined to be nearby the Gateway device 103, the Gateway device 103 will connect to the target RF device 104 if not already connected to the target RF device 104. The Gateway device 103 will then write to the target RF device 104 the command downloaded from the server 102. The Gateway device 103 can then disconnect or stay connected to the target RF device 104. The Gateway device 103 will report back a success code to the server 102. In another implementation, Gateway device 103 can choose not to report back any data to the server 102. Once the server 102 receives the success code from the Gateway device 103, the server 102 will relay this information back to the remote device 104 or perform other actions with the success code such as storing the command was successfully written in a database along with a timestamp.

Example Methods for Object Tracking within a Defined Area

Figure 2:
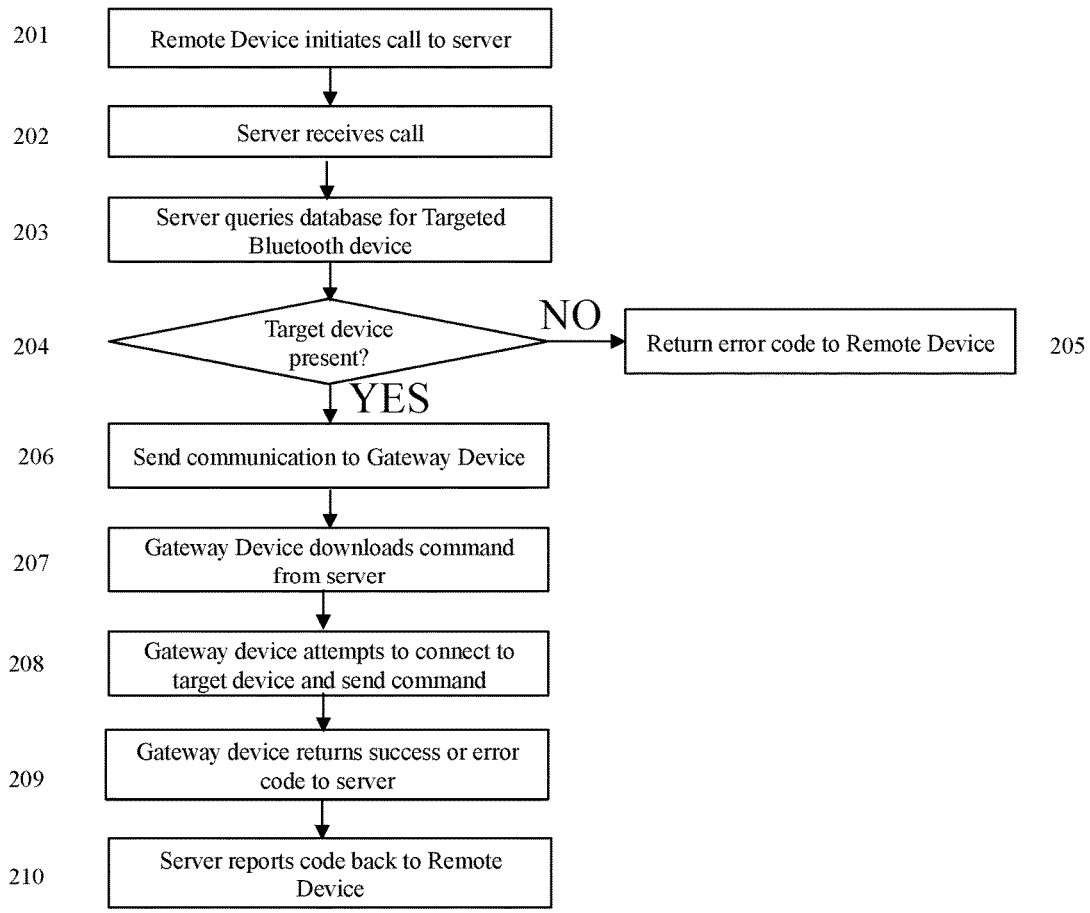
FIG. 2 is a flowchart of an exemplary method for sending a command to the Target RF Device from a Remote Device.

Attention is now directed to FIG. 2, which shows an exemplary method used for a Remote Device writing a command to a Target RF device. In FIG. 2, the algorithm begins with the Remote device sending the command to the server (201) and the server receives the command (202). After the server receives the command containing the RF device unique identifier, it will query the server for Gateway devices that have recently been in contact with the Target RF device (203). The server determines if the target RF device has recently been in contact with a Gateway device within a predetermined period of time (204) and in the case that a Gateway device has not recently been in contact with a Target RF device, the server will return an error code to the remote device (205). The server could optionally not return any code to the remote device. In the case that a Gateway device has been recently in contact with a target RF device, the server sends the command information to the Gateway device (206) via a push or poll communication standard. The Gateway device downloads the command data from the server (207) and scans for the target RF device and attempts to connect to the target RF device (208). The Gateway device will then return a success or failure code back to the server (209) and the server can relay this information back to the remote device (210).

Figure 3:
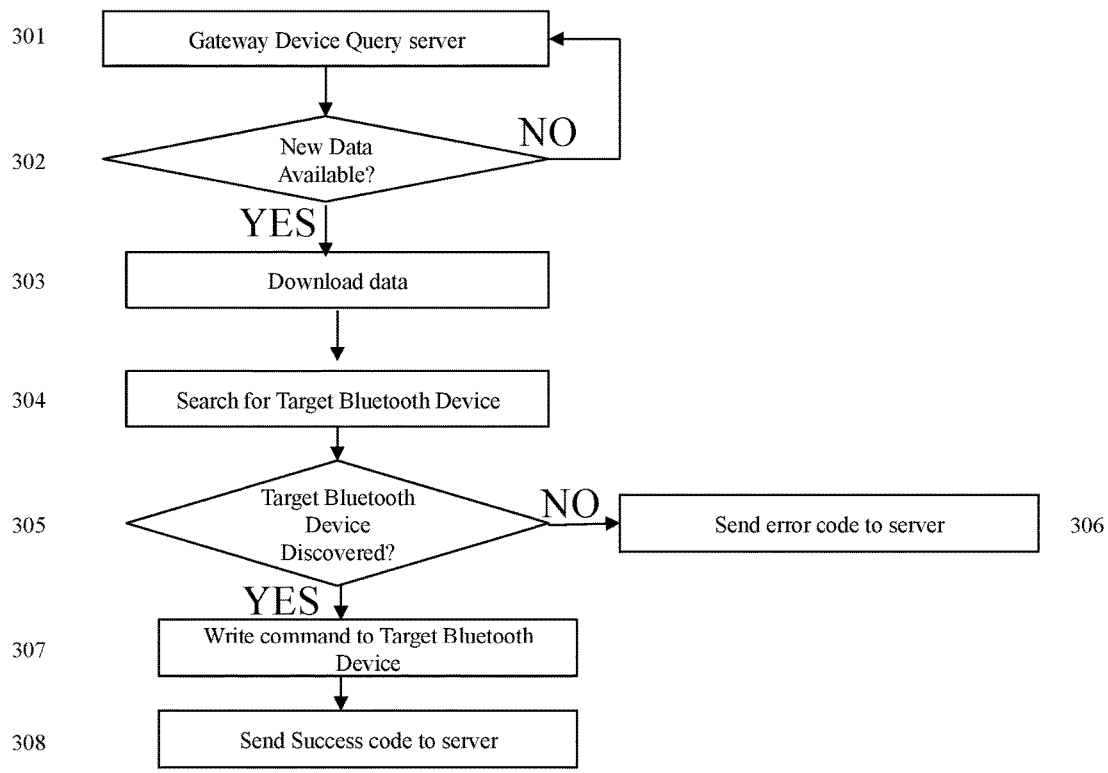
FIG. 3 is a flowchart of an exemplary method for Gateway Device discovering and communicating to the Target RF Device.

It is also possible to set the query frequency of the Gateway device based on Gateway device battery level Turning to FIG. 3, FIG. 3 shows an exemplary method for the Gateway device communicating with the server and target Remote device. In FIG. 3, the algorithm begins with the Gateway device querying the server via push or poll methodology (301) to see if there is new data available (302). If there is no data available, the Gateway device will continue to contact the server periodically based on an algorithm defined by the application running on the Gateway device. The algorithm for querying the server could be based a time or based on the interaction with RF devices. If there is new data available, the Gateway device will download the command data from the server (303) and begin searching for the target RF device (304). The Gateway device will then determine if it was able to detect the target RF device (305) and in the case the target RF device was not discovered, the Gateway device will send an error code to the server (306)

or optionally not return any error code back to the server. If the Gateway device detects the Target RF device, the Gateway device will proceed to connect to the Target RF device and write the command to the Target RF device (307). Once the Gateway has determined the Target RF device was successfully issued the command, the Gateway device will return a success code back to the server (308).

Figure 4:
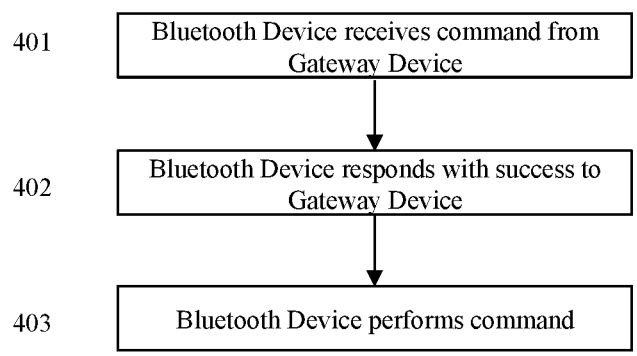
FIG. 4 is a flowchart of an exemplary method for the RF Device communicating to the Gateway Device.

Attention is now turned to FIG. 4, which shows an exemplary method for the RF device responding to receiving commands from a Gateway device. In FIG. 4, the algorithm begins with the RF device receiving a command from the Gateway device (401) while connected or receives the command detecting an advertising packet from the Gateway device. The Target RF device will then respond back to the Gateway device with a success code that the command was received (402) and the Target RF device performs the command (403).

Figure 5:
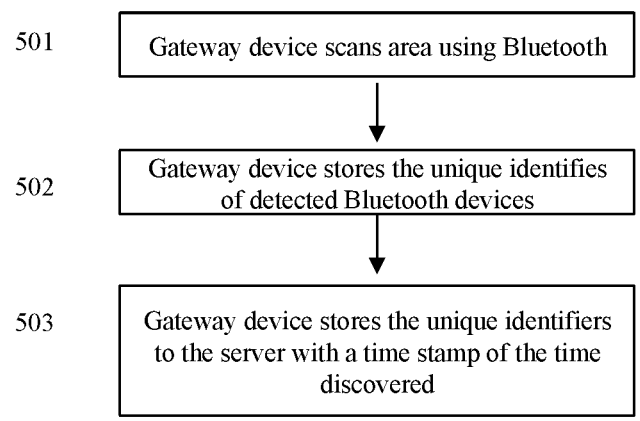
FIG. 5 is an exemplary method for the Gateway sending information about which target RF devices are nearby the Gateway device.

Attention is now turned to FIG. 5, which shows an exemplary method for the Gateway sending which target RF devices are nearby the Gateway device. In FIG. 5, the Gateway device scans the area (501) and this can be done using Bluetooth or another RF protocol. The Gateway device can also detect what RF devices are currently connected to the Gateway device. The Gateway device stores the unique identifiers of the discovered RF devices locally (502) or the Gateway generates the unique identifiers for the discovered devices and stores them. The Gateway device then stores the discovered Bluetooth device unique identifiers on the server with a time stamp (503) along with any other information that could be useful to the application.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

As used in this specification, an element and/or application can be, for example, any assembly and/or set of operatively-coupled electrical components associated with performing a specific function(s), and can include, for example, a memory, a processor, electrical traces, optical connectors, software (that is stored in memory and/or executing in hardware) and/or the like.

Some embodiments of the communications techniques described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. For a system comprising at least one software capable remote device, at least one software and database capable server, at least one software capable and rf capable gateway device, and at least one RF device with a unique identifier, a method, comprising;
    initiating a call from the remote device to the server;
    receiving the call identifying at least one targeted RF device at the server;
    querying the server data base to determine if the targeted device is listed, and if not send error coded back to remote device;
    establishing communication between the server and the gateway device;
    downloading commands for targeted device from server to gateway device;
    attempting to communicate with targeted RF device, and if the device has been contacted within a predetermined time and sending command to targeted RF device; and,
    sending at least one of a success or error report from gateway device to server onto remote device;
    wherein establishing communication between the server and the gateway device comprises at least one of the gateway device querying the server and determining if new data is available or having the data pushed to the gateway device from the server.

2. The method of claim 1, further comprising setting the query frequency for a targeted RF device based on the battery level of the gateway device.

3. The method of claim 1, further comprising:
    receiving commands by the RF device from the gateway device;
    responding with a success report from the RF device to the gateway device; and,
    performing the commands by the RF device.

4. The method of claim 1, wherein the RF device and the gateway device communicate over an RF communication protocol.

5. The method of claim 4, wherein the RF communication protocol includes one or more of Bluetooth, RFID, Zigbee, or 802.11 WiFI.

6. The method of claim 1, wherein the gateway device is a client device including one or more of a computer, router, phone, tablet, or smart plug.

7. The method of claim 1, wherein the Remote Device is a Personal Electronic Device including computer, smartphones, tablets, and other internet enabled devices.

8. For a system comprising at least one software capable remote device, at least one software and database capable server, at least one software capable and rf capable gateway device, and at least one RF device with a unique identifier, a method, comprising;
    initiating a call from the remote device to the server;
    receiving the call identifying at least one targeted RF device at the server;
    querying the server data base to determine if the targeted device is listed, and if not send error coded back to remote device;
    establishing communication between the server and the gateway device;
    downloading commands for targeted device from server to gateway device;
    attempting to communicate with targeted RF device, and if the device has been contacted within a predetermined time and sending command to targeted RF device;
    sending at least one of a success or error report from gateway device to server onto remote device
    scanning an area by the gateway device;
    storing the unique identifier of any RF devices found in the area; and,
    storing the detected unique identifiers by the gateway device on the server.

9. The method of claim 8, further comprising storing a time stamp of the time discovered for at least one unique identifier.

10. A system comprising at least one software capable remote device, at least one software and database capable server, at least one software capable and rf capable gateway device, and at least one RF device with a unique identifier, configured to;
    initiate a call from the remote device to the server;
    receive the call identifying at least one targeted RF device at the server;
    query the server data base to determine if the targeted device is listed, and if not send error coded back to remote device;
    establish communication between the server and the gateway device;
    download commands for targeted device from server to gateway device;
    attempt to communicate with targeted RF device, and if the device has been contacted within a predetermined time and send command to targeted RF device; and,
    send at least one of a success or error report from gateway device to server onto remote device;
    wherein establishing communication between the server and the gateway device comprises at least one of the gateway device querying the server and determining if new data is available or having the data pushed to the gateway device from the server.

11. The system of claim 10, further configured to set the query frequency for a targeted RF device based on the battery level of the gateway device.

12. The system of claim 10, further configured to:
    receive commands by the RF device from the gateway device;
    respond with a success report from the RF device to the gateway device; and,
    perform the commands by the RF device.

13. The system of claim 10, wherein the RF device and the gateway device communicate over an RF communication protocol.

14. The system of claim 13, wherein the RF communication protocol includes one or more of Bluetooth, RFID, Zigbee, or 802.11 WiFI.

15. The system of claim 10, wherein the gateway device is a client device including one or more of a computer, router, phone, tablet, or smart plug.

16. The system of claim 10, wherein the Remote Device is a Personal Electronic Device including computer, smartphones, tablets, and other internet enabled devices.

17. A system comprising at least one software capable remote device, at least one software and database capable server, at least one software capable and rf capable gateway device, and at least one RF device with a unique identifier, configured to;
   initiate a call from the remote device to the server;
   receive the call identifying at least one targeted RF device at the server;
   query the server data base to determine if the targeted device is listed, and if not send error coded back to remote device;
   establish communication between the server and the gateway device;
   download commands for targeted device from server to gateway device;
   attempt to communicate with targeted RF device, and if the device has been contacted within a predetermined time and send command to targeted RF device;
   send at least one of a success or error report from gateway device to server onto remote device;
   scan an area by the gateway device;
   store the unique identifier of any RF devices found in the area; and,
   store the detected unique identifiers by the gateway device on the server.

18. The system of claim 17, further configured to store a time stamp of the time discovered for at least one unique identifier.

* * * * *